United States Patent
Mullins et al.

(10) Patent No.: US 7,099,461 B2
(45) Date of Patent: Aug. 29, 2006

(54) SYSTEM AND METHOD FOR THE POWERING AND FAULT PROTECTION OF REMOTE TELECOMMUNICATIONS EQUIPMENT

(75) Inventors: Clive Mullins, Ottawa (CA); Martin Bijman, Stittsville (CA)

(73) Assignee: Ciena Corporation, Linthicum, MD (US)

( * ) Notice: Subject to any disclaimer, the term of this patent is extended or adjusted under 35 U.S.C. 154(b) by 71 days.

(21) Appl. No.: 10/881,329

(22) Filed: Jun. 29, 2004

(65) Prior Publication Data

US 2005/0053228 A1    Mar. 10, 2005

(30) Foreign Application Priority Data

Jun. 30, 2003    (CA) .................................. 2434111

(51) Int. Cl.
*H04M 1/00*    (2006.01)
*H02H 1/04*    (2006.01)

(52) U.S. Cl. ........................ 379/412; 361/119
(58) Field of Classification Search ........... 379/392.01, 379/395.01, 412, 416; 361/119
See application file for complete search history.

(56) References Cited

U.S. PATENT DOCUMENTS

| | | | |
|---|---|---|---|
| 3,992,634 A | | 11/1976 | Larson |
| 4,494,064 A | | 1/1985 | Harkness |
| 4,761,812 A | * | 8/1988 | Hollis et al. ................. 379/413 |
| 5,014,308 A | * | 5/1991 | Fox ............................. 379/413 |
| 5,087,871 A | * | 2/1992 | Losel ........................... 323/299 |
| 5,574,632 A | * | 11/1996 | Pansier ......................... 363/49 |
| 6,356,468 B1 | * | 3/2002 | Havukainen et al. ......... 363/49 |
| 2004/0057188 A1 | * | 3/2004 | Phillips et al. .............. 361/119 |
| 2004/0189271 A1 | * | 9/2004 | Hansson et al. ............. 323/283 |

OTHER PUBLICATIONS

International Search Report and Written Opinion,of PCT/US04/21220.

* cited by examiner

*Primary Examiner*—Daniel Swerdlow
(74) *Attorney, Agent, or Firm*—Merek, Blackmon & Voorhees, LLC

(57) ABSTRACT

A protection circuit for telecommunications equipment powered remotely through a twisted pair subscriber loop, comprising: a charge storage circuit, coupled to the subscriber loop through an arm switch in parallel with an inrush resistor, for storing charge received from the subscriber loop, the charge storage circuit coupled to the telecommunications equipment for providing the charge thereto; a fault detection circuit for setting a first signal during a period of normal operation of the protection circuit and for resetting the first signal for a predetermined period during a fault; a processor adapted for setting an arm signal during the period of normal operation of the protection circuit; and, an AND logic circuit coupled to the arm switch, fault detection circuit, and processor for comparing the first and arm signals and for setting a third signal for opening and closing the arm switch.

36 Claims, 3 Drawing Sheets

SYSTEM AND METHOD FOR THE POWERING AND FAULT PROTECTION OF REMOTE TELECOMMUNICATIONS EQUIPMENT

This application claims priority from Canadian Patent Application Number 2,434,111, filed Jun. 30, 2003 and incorporated herein by reference.

FIELD OF THE INVENTION

The present invention relates to the field of telecommunication networks, and more specifically to systems and methods for the powering and fault protection of electronic equipment where the electronic equipment is connected to one end of a subscriber loop and the power source used to power the electronic equipment is connected to the other end of the subscriber loop.

BACKGROUND OF THE INVENTION

In telecommunications systems, some equipment may be located in a remote location where accessing a power source to power the equipment is neither economical nor desirable due to cost or marketing considerations. In these situations, the remote equipment may be powered from a power source through the same type of subscriber loop twisted pair wires (subscriber loops) that are normally used to deliver telecommunication services from service provider equipment to subscriber premises. In this situation, the remote equipment is said to be "loop powered". Remote equipment that may be loop powered may include remote terminals (RT), pairgain devices, loop extenders, network interface devices (NID), optical network termination (ONT) equipment, integrated access devices (IAD), and subscriber communication equipment such as a POTS (plain old telephone service) telephone, IP (Internet Protocol) telephone, FAX, set top box, or data modem.

FIG. 1 is a circuit diagram illustrating a typical environment 100 for loop powered remote equipment 110. The power source 102 that sources charge to the subscriber loop 104 is typically an earth referenced power supply with an output impedance of typically less than 5 ohms. The subscriber loop 104 is located physically in the external environment and may be subject to faults 106 from lightning 150 and mains power lines 160. Primary protectors 108 are provided on each wire at each end 103, 105 of the subscriber loop 104. The remote equipment 110 typically consists of a protection circuit 120 which includes protection electronics 170 and also a charge storage circuit 180 with an input impedance of typically less than 5 ohms. Subsequent electronics 130, 140 in the remote equipment 110 may include a power supply 130 that typically uses a transformer 190 to isolate the application electronics 140 from the high voltages that may occur on the subscriber loop 104 due to faults 106 and a regulator 191 to develop a stable power supply to power the application electronics 140.

Due to their physical location in the external environment, faults 106 may occur between the subscriber loops 104 and foreign potentials. These faults may include lightning 150 induced current and voltage, as well as power cross and induced AC current from mains power wires 160. For subscriber loops that are used for the delivery of mainstream telecommunications services to subscribers who use, for example, POTS telephones, modems, fax machines, and data modems, a number of systems are known for the protection of subscriber loop electronics that source charge on one end 103 of the subscriber loop 104, typically in the line card of the service provider, and electronics that sink charge from the other side 105 of the subscriber loop 104, typically the subscriber location. However, these systems are not applicable to subscriber loops that are used for the loop powering of remote equipment, in that the series impedance of electronics on each end of the subscriber loop utilized for loop powering, typically a few ohms, is considerably lower than the series impedance of the electronics on a subscriber loop used for mainstream applications, typically 100 ohms or more. For example, the currents developed from a lightning strike of 1000 V would be 20 times higher in the loop powered circuits, since the input impedance is 20 times smaller.

In general, primary protectors 108 are provided on subscriber loops for shunting charge to earth typically when the potentials across the primary protector exceed several hundred volts. All circuits connected to the primary protectors 108 must operate with consideration of the independent behaviour of these primary protectors 108.

The power supply 102 that sources charge to one end 103 of a subscriber loop 104 is typically earth referenced, thus protection circuits from faults beyond the primary protectors 108 may be designed using relatively simple circuits, or very often no additional circuits at all, that would shunt the fault energy locally to earth. Such protection circuits may be designed to maintain the connection between the power source 102 and the subscriber loop 104 throughout fault events, however this is not always the case.

Equipment 110 located remotely that is loop powered must sink current from a subscriber loop 104. However, such equipment cannot be earth referenced and typically prevents the conduction of current to earth for voltages within the primary protector activation voltage range. Furthermore, the energy that enters the remote equipment 110 may be common mode which occurs when a fault influences both wires of the subscriber loop twisted pair 104, or differential mode which occurs when one of the primary protectors activates prior the other primary protector on the subscriber end 105 of the subscriber loop 104. Thus, protection circuits for electronics that sink energy from a subscriber loop 104 and that form the power supply of remotely powered electronics equipment 110 are challenging to design effectively.

For the protection of remote equipment 110, beyond the primary protectors 108, existing systems typically use simple electronic circuits 170 that have several drawbacks. For example, fuses may be used, however, these require replacement by a service technician after every fault.

Thyristors may be used to activate prior to the primary protectors 108 or in coordination with the primary protectors 108, however as this design method requires the thyristors to conduct most of the energy in the fault event, the thyristors must therefore be quite large. Also, the voltage developed across the thyristors may have large peaks during the fault event that is presented across the subsequent electronics 130, 140, thus the subsequent electronics 130, 140 must be over-designed and expensive. Furthermore, standards bodies are now requiring more stringent testing, thus solutions based on thyristors have greater difficulty achieving compliance.

A relay or solid state switch to isolate the remote electronics 110 may be used that is activated when sensors detect a fault event. However, relays being mechanical are prone to wear and tear. In addition, if a relay or solid state switch is used to disconnect the subsequent electronics 130, 140 when a fault occurs and later reconnect to the subscriber loop 104 when the fault is cleared, a service interruption results.

These protection circuits are thus expensive to deliver and maintain and result in interruption of service when faults occur.

Even new generation remote telecommunications equipment that is loop powered with copper subscriber loops, and that relies on optical fiber for all transmission, is subject to disruption of service if the remote equipment 110 is susceptible to outages due to fault conditions that affect the copper subscriber loop (i.e., but not the optical fiber). Such remote equipment 110 may require the addition of battery power if achieving minimum service disruption is an objective. This results in increased costs for capital equipment and maintainance.

A need therefore exists for an effective power and protection system for loop powered remote equipment. Consequently, it is an object of the present invention to obviate or mitigate at least some of the above mentioned disadvantages.

SUMMARY OF THE INVENTION

According to one aspect of the invention, there is provided a protection circuit for telecommunications equipment powered remotely through a twisted pair subscriber loop. The protection circuit includes: a charge storage circuit, coupled to the subscriber loop through an arm switch in parallel with an inrush resistor, for storing charge received from the subscriber loop, the charge storage circuit coupled to the telecommunications equipment for providing the charge thereto; a fault detection circuit for setting a first signal during a period of normal operation of the protection circuit and for resetting the first signal for a predetermined period during a fault; a processor adapted for setting an arm signal during the period of normal operation of the protection circuit; and, an AND logic circuit coupled to the arm switch, fault detection circuit, and processor for comparing the first and arm signals and for setting a third signal for closing the arm switch during the period of normal operation and for resetting the third signal for opening the arm switch during the predetermined period during the fault; whereby the charge storage circuit continues storing charge through the inrush resistor during the fault.

Preferably, the fault detection circuit provides the first signal by comparing a voltage measured across the arm switch to predetermined low and high voltages for each of the period of normal operation and the predetermined period during the fault, respectively.

Preferably, the protection circuit further includes a diode circuit coupled between the arm switch and subscriber loop for half-wave rectifying input voltage and current signals from the subscriber loop.

Preferably, the protection circuit further includes a suppression circuit coupled between the arm switch and the subscriber loop for suppressing electromagnetic interference (EMI) on the input voltage and current signals.

Preferably, the suppression circuit includes first and second series inductors coupled to a parallel capacitor.

Preferably, the protection circuit further includes a connect switch coupled between the charge storage circuit and the telecommunications equipment, the connect switch coupled to and controlled by the processor through a connect signal to disconnect the protection circuit from the telecommunications equipment.

Preferably, the protection circuit further includes an inrush switch coupled in series with the inrush resistor, the inrush switch coupled to and controlled by the processor through an inrush signal to disconnect the inrush resistor.

Preferably, the charge storage circuit includes: a voltage sensor coupled to the processor for measuring voltage provided to the telecommunications equipment and for providing a corresponding voltage signal to the processor; and, a current sensor coupled to the processor for measuring current provided to the telecommunications equipment and for providing a corresponding current signal to the processor.

Preferably, the charge storage circuit further includes a series resistor coupled between first and second parallel capacitors.

Preferably, the voltage sensor measures voltage across the first parallel capacitor and the current sensor measures current by measuring the voltage across the series resistor.

Preferably, the processor is further adapted to, when the voltage signal exceeds a predetermined maximum voltage: reset the inrush signal to open the inrush switch and disconnect the inrush resistor; and, modulate the arm signal, thereby reducing the voltage provided to the telecommunications equipment.

Preferably, the arm signal is pulse-width modulated.

Preferably, the processor is further adapted to reset the connect signal to open the connect switch and disconnect the protection circuit from the telecommunications equipment when at least one of the voltage signal is below a predetermined minimum voltage and the current signal exceeds a predetermined maximum current.

Preferably, the processor is further adapted to, during a period of initial operation of the protection circuit: reset the arm signal to open the arm switch; reset the connect signal to open the connect switch; and, set the inrush signal to close the inrush switch, thereby allowing the charge storage circuit to charge through the inrush resistor.

Preferably, the processor is further adapted to, when the voltage signal drops below the predetermined low voltage: set the arm signal to close the arm switch and short out the inrush resistor, thereby allowing the charge storage circuit to charge more rapidly through the arm switch; and, set the connect signal to close the connect switch.

Preferably, the fault includes a lightning induced current fault, a lightning induced voltage fault, a power cross fault, and induced AC current from mains power wires.

Preferably, the processor is a microprocessor, a state machine, or a linear circuit.

According to another aspect of the invention, there is provided a method for protecting telecommunications equipment powered remotely through a twisted pair subscriber loop, comprising: storing charge received from the subscriber loop in a charge storage circuit coupled to the subscriber loop through an arm switch in parallel with an inrush resistor, the charge storage circuit coupled to the telecommunications equipment for providing the charge thereto; setting a first signal with a fault detection circuit during a period of normal operation and resetting the first signal for a predetermined period during a fault; setting an arm signal with a processor during the period of normal operation; and, comparing the first and arm signals with an AND logic circuit coupled to the arm switch, fault detection circuit, and processor to set a third signal for closing the arm switch during the period of normal operation and to reset the third signal for opening the arm switch during the predetermined period during the fault; whereby the charge storage circuit continues storing charge through the inrush resistor during the fault.

Advantageously, the processor allows for flexibility to optimally configure the protection circuit for various fault events. These fault events are sensed by the processor through its current and voltage analog inputs, the data from which is processed to control the processor's connect, inrush, and arm digital outputs such that the telecommunications equipment connected to the protection circuit is subject to minimum stress through rapid response to the fault event.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
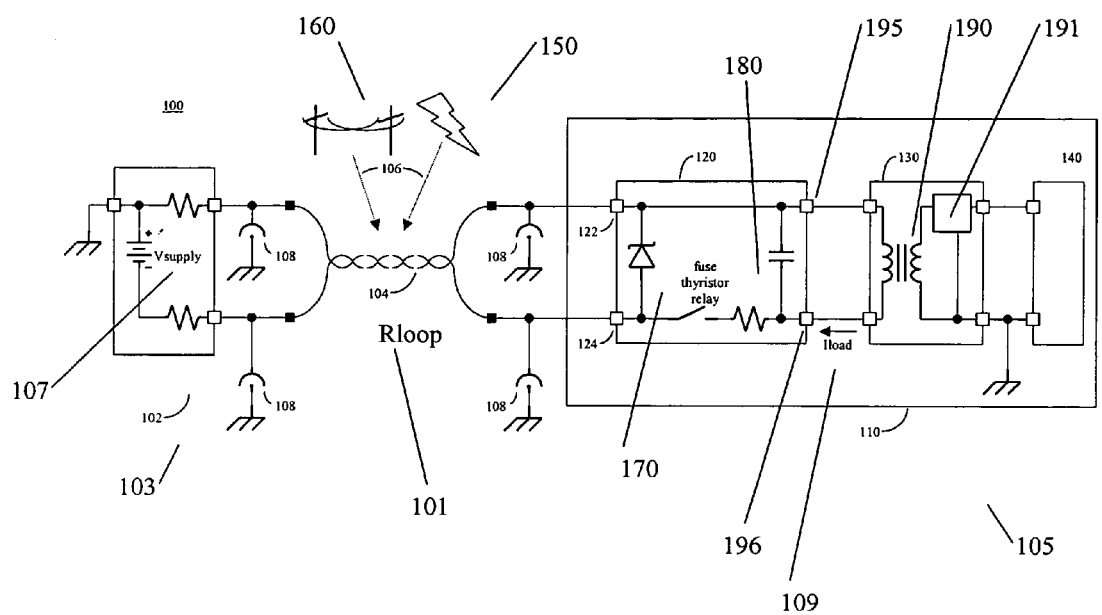
FIG. 1 is a circuit diagram illustrating a typical environment for loop powered remote equipment.

In the following description, numerous specific details are set forth to provide a thorough understanding of the invention. However, it is understood that the invention may be practiced without these specific details. In other instances, well-known structures and/or processes have not been described or shown in detail in order not to obscure the invention.

Referring again to FIG. 1, in this environment 100 and in the presence of the illustrated external protection electronics 108, a number of fault conditions may be presented at the input nodes 122 and 124 of the remote equipment 110.

When lightning 150 strikes in close proximity to the subscriber loop 104, current is induced in the subscriber loop 104 which may develop a potential difference between nodes 122 and 124 that exceeds the activation voltage of the primary protectors 108. Due to the independent nature of the primary protectors 108, one protector may change from open circuit to closed circuit before the second protector does resulting in a differential voltage appearing across terminals 122 and 124. These faults may have either polarity. This event will be referred to as a "lightning event" in the following. A lightning event typically lasts tens of microseconds.

Similarly, lightning 150 may strike in close proximity to the subscriber loop 104 and both primary protectors 108 on the wires connected to terminals 122 and 124 may activate at approximately the same time. In this event, the fault potential is experienced on both nodes 122, 124 simultaneously and with the same polarity. This type of fault may be referred to as a "common mode potential fault event".

Due to the close proximity of power lines 160 to the subscriber loop 104, currents typically as high as 100 mA may be induced in the subscriber loop 104 and that will appear common mode on both wires at each end 103, 105 of the subscriber loop 104. However, once they find a current path, these currents will generally not create sufficient potential to activate the protectors 108. This type of fault, which may be referred to as a "common mode induced current fault", may occur indefinitely during normal operation.

Similarly due to the close proximity of power lines 160 to the subscriber loop 104, physical events may occur that result in the power line 160 connecting to the subscriber loop 104, typically through some resistance due to physical aspects of the fault connection. This type of fault may be referred to as a "power cross event" and may be sustained for long periods of time until the physical fault connection is removed and repaired.

Figure 2:
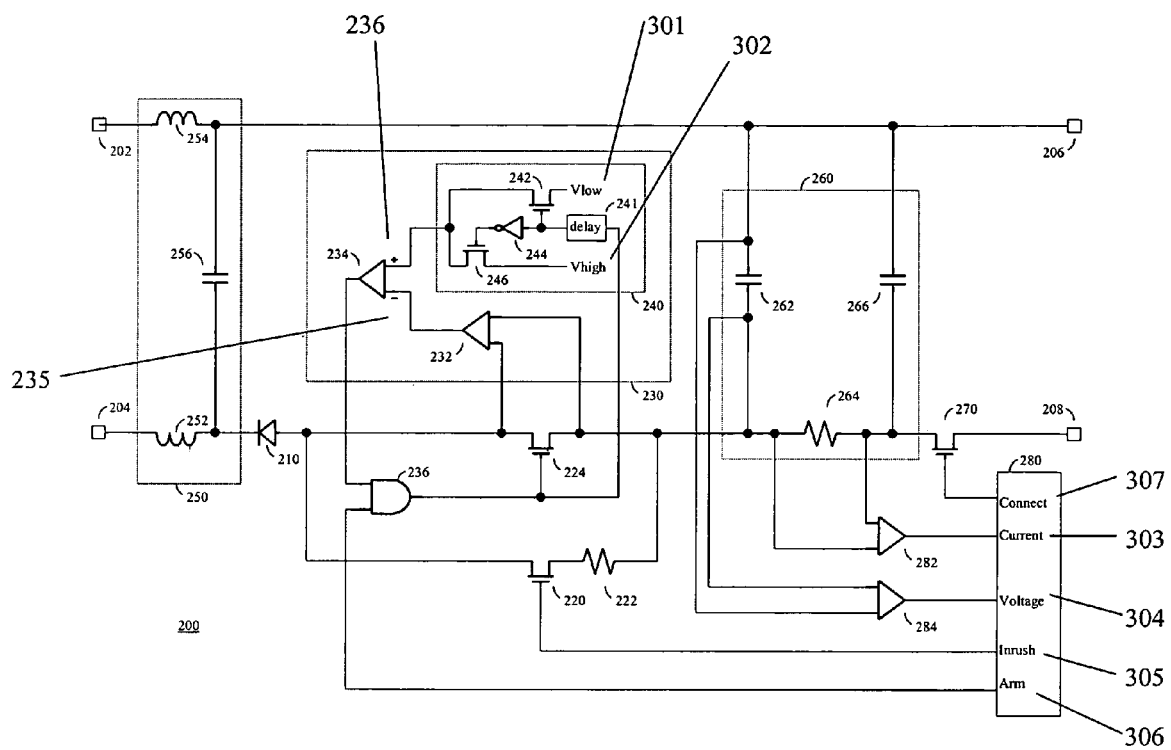
FIG. 2 is a circuit block diagram illustrating a charge storage and protection circuit (CSAPC) in accordance with an embodiment of the invention; and, FIG. 3 is a flow chart illustrating operations of modules within a processor for controlling the charge storage and protection circuit (CSAPC) in accordance with an embodiment of the invention.

FIG. 2 is a circuit block diagram illustrating a charge storage and protection circuit (CSAPC) 200 in accordance with an embodiment of the invention. The CSAPC 200 is designed to replace the protection circuit 120 shown in FIG. 1. The CSAPC 200 includes a electromagnetic interference (EMI) suppression circuit 250, a diode circuit 210, a fault detection circuit 230, an arm switch 224, an inrush resistor 222, an inrush switch 220, an "AND" logic circuit 236, a charge storage circuit 260, a connect switch 270, and a processor 280. The function of the components of the CSAPC 200 will now be described.

Circuit 250 provides EMI suppression. Input diode 210 serves to block all reverse current from the subscriber loop 104 that attempts to enter at node 204 (124 in FIG. 1) and leave at node 202 (122 in FIG. 1). Switch 220 and resistor 222, which is typically 400 ohms, serve to limit inrush current, and switch 224 is activated after the inrush event is completed.

Charge storage circuit 260 consists of capacitor 262 and capacitor 266 coupled through resistor 264, which is typically 0.5 ohms.

Lightning protection is provided generally by circuit 230. Linear circuit 232 presents the voltage sensed across switch 224 to the negative input 235 of voltage comparator 234. Threshold selection circuit 240 outputs one of two voltages to the positive input 236 of voltage comparator 234, either "Vlow" 301 when switch 242 is on, which occurs whenever switch 224 is on, or "Vhigh" 302 when switch 246 in on, which occurs whenever switch 224 is off, as inverted by inverter 244.

Delay circuit 241 implements the change in threshold output from circuit 240 a short time after a change in state of switch 224, typically 10 µs. When the positive input 236 to comparator 234 is greater in potential than the negative input 235, its output is on, which turns on switch 224 depending on the state of AND gate 236.

Switch 270 connects the charge storage circuit 260 to the subsequent electronics 130, 140 connected to nodes 206 (195 in FIG. 1) and 208 (196 in FIG. 1).

Linear circuit 282 presents the voltage sensed across resistor 264 to the processor 280 via the processor's "Current" 303 analog input, the voltage being proportional to the current through resistor 264. Linear circuit 284 presents the voltage sensed across capacitor 262 to the processor 280 via the processor's "Voltage" 304 analog input.

The processor 280, which may be powered directly from capacitor 262, is adapted to execute in a timed sequence a process based on linear input voltages Current 303 and Voltage 304 to output voltages at the processor's digital outputs "Inrush" 305, "Arm" 306, and "Connect" 307 to activate switch 220, switch 224 depending on the state of AND gate 236, and switch 270, respectively. The processor 280 may be a microprocessor, a state machine, or a linear circuit. The processor 280 may include memory (not shown) such as RAM, ROM, disk drives, databases, etc. The processor 280 has stored therein data representing sequences of instructions which when executed cause the process described herein to be performed. Of course, the processor 280 may contain additional software and hardware a description of which is not necessary for understanding the invention.

In particular, the processor 280 includes computer executable programmed instructions for directing the CSAPC 200 to implement the embodiments of the present invention. The programmed instructions may be embodied in one or more software modules (not shown) resident in the memory of the processor 280. Alternatively, the programmed instructions may be embodied on a computer readable medium (such as a CD disk, floppy disk, memory card, or memory chip) which may be used for transporting the programmed instructions to the memory of the processor 280. Alternatively, the programmed instructions may be embedded in a computer-readable, signal-bearing medium that is uploaded to a network by a vendor or supplier of the programmed instructions, and this signal-bearing medium may be downloaded through an interface (not shown) to the processor 280 from the network by end users, suppliers, buyers, etc.

Moreover, the following description does not limit the implementation of the invention to any particular computer programming language. The present invention may be implemented in any computer programming language provided that the operating system (OS) of the processor 280 provides the facilities that may support the requirements of the present invention. A preferred embodiment is implemented in the C or C++ computer programming language (or other computer programming languages such as assembler). Any limitations presented would be a result of a particular type of operating system or computer programming language and would not be a limitation of the present invention.

Figure 3:
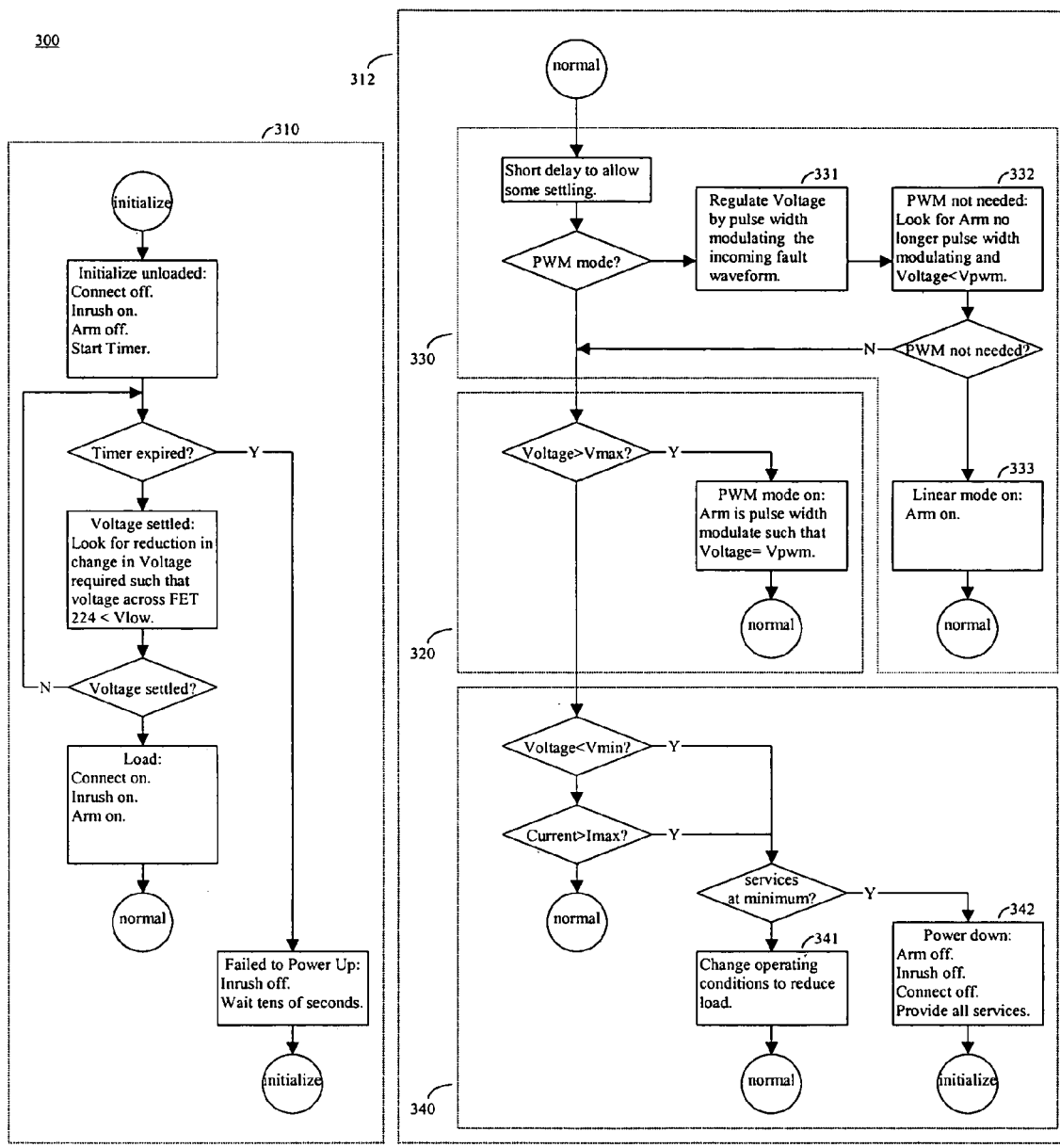

FIG. 3 is a flow chart illustrating operations 300 of modules within a processor 280 for controlling the charge storage and protection circuit (CSAPC) 200 in accordance with an embodiment of the invention. The initialize operation 310 is the state of operations 300 wherein the CSAPC 200 attempts to settle the charge storage circuit 260 to a stable voltage. The normal operation 312 is the state of operations 300 when the CSAPC 200 is not in the initialize operation 310.

With respect to normal operation 312, "Vmax" is the maximum Voltage (i.e., as measured at input 304 in FIG. 2) that can be tolerated by the subsequent electronics 130, 140 connected at nodes 206 and 208 (see FIG. 2) under normal operation. "Vpwm" is a voltage margined several volts below Vmax that would be the Voltage 304 delivered to the subsequent electronics 130, 140 at nodes 206 and 208 when in pulse width modulation (PWM) mode, as described below. "Imax" is the load Current (i.e., as measured at input 303 in FIG. 2) that is beyond the expected current range of the subsequent electronics 130, 140 at nodes 206 and 208 under normal operation. "Vmin" is the Voltage 304 that is too low to sustain the basic operation or functionality of the subsequent electronics 130, 140 at nodes 206 and 208.

The "PWM mode" is the state of normal operation 312 for actively preventing charge from entering the charge storage circuit 260 (see FIG. 2) such that Voltage 304 does not rise higher than Vpwm. The "Linear mode" is the state of normal operation 312 when not in PWM mode.

When in PWM mode, operation 330 selects operation 331 to execute PWM. That is, the Voltage 304 is regulated through PWM of the incoming fault waveform. Operation 332 then detects when PWM is no longer needed, such that operation 330 may select operation 333 and enter the Linear mode.

Operation 320 detects if Voltage 304 exceeds Vmax, and selects to enable the PWM mode. Operation 340 detects conditions which result when too little charge is entering the charge storage circuit 260 or too much charge is being drawn from the charge storage circuit 260 such that Current 303 exceeds Imax or Voltage 304 is less than Vmin, respectively, and selects operation 341 to reduce operating conditions or operation 342 to power down and enter the initialize operation 310.

Referring to FIG. 1, current supplied from the power source 102 on the power source end 103 of the subscriber loop 104 is normally DC (direct current) in nature, which is required to enter node 122 and leave node 124 on the remote equipment end 105 of the subscriber loop 104. The voltage from node 122 to node 124 may vary. The voltage delivered by the power source 102 on the power source end 103 of the subscriber loop 104 may be referred to as "Vsupply" 107 (see FIG. 1), and may range from 10 V to 200 V. The current load of the subsequent electronics 130, 140 may be referred to as "Iload" 109 (see FIG. 1) The resistance of a subscriber loop 104, which may be referred to as "Rloop" 101 (see FIG. 1), may vary from one loop to the next and between 0 ohms to 2000 ohms. Depending on the application, the maximum Rloop 101 that can be tolerated for a given Vsupply 107 and Iload 109 may require the use of several parallel subscriber loops.

Referring to FIG. 2, protection diode 210 results in only a marginal decrease of the supplied voltage, less than one volt, at the subscriber loop interface at nodes 202 and 204 but serves several purposes. First, it prevents the CSAPC 200 from being subject to reverse potentials at nodes 202 and 204, if the subscriber loop 104 is connected backwards. Further, diode 210 serves to reduce fault energy by approximately half, on average, as the diode blocks all faults that cause the current in the subscriber loop 104 to reverse. Thus, any faults that generate a potential at node 204 that is more positive than the potential at node 202 are blocked by diode 210 and are thus rendered benign. Third, during a fault event where the current in the subscriber loop 104 is AC (alternating current) in nature, diode 210 half-wave rectifies the current and in essence supplies additional charge into the CSAPC 200 that may be used to power the remote equipment 110 during such a fault. As such, it is an advantage of the present invention that the remote equipment 110 can be normally powered directly from a mains AC power source located near the remote equipment 110 rather than through the powered subscriber loop 104, noting that mains AC power sources are generally readily available and convenient.

Upon connection of the remote equipment 110 to the powered subscriber loop 104, or when processor 280 begins its initialize operation 310, Inrush 305 (see FIG. 2) is set to on which turns on switch 220, Arm 306 is set to off which turns off switch 224 through AND gate 236, and Connect 307 is set to off which turns off switch 270.

Vhigh 302 is set to be approximately 5 V greater than the voltage settled across switch 224 at the end of a lightning event, which depends on the application selection of Vsupply 107, maximum Iload 109, which determines the maximum Rloop 101 allowable, and the resistance of resistor 222. For example, for Vsupply 107=190 V, Rloop 101=600 ohms, and resistor 222 selected to be 400 ohms, Vhigh 302 would be 75 V.

Vlow 301 is set a few volts higher than the worst case maximum of two voltages. The first voltage is the voltage developed across switch 224 which corresponds to the desired current flowing through switch 224 in a lightning event at which point switch 224 is to be turned off. For example, if the on-impedance of switch 224 is selected to be 1.25 ohms when the maximum desired current flows through switch 224 is set at 5 amps, the first voltage is 6.25 V. The second voltage is the maximum decay across the charge storage device 260 for one cycle of the AC power fail fault frequency under maximum Iload 109. For example, if the total capacitance 262, 266 of the charge storage circuit 260 is 500 µF and the maximum Iload 109 is 700 mA, the decay in one cycle at 60 Hz is 6 V. Thus, for the first and second voltages of this example, Vlow 301 would be set to approximately 10 V (i.e., a few volts higher than 6.25 V).

The power-up or initialize operation 310 of the processor 280 and CSAPC 200 will now be described. When the CSAPC 200 is first powered, current from the subscriber loop 104 initially flows to storage capacitor 262 through switch 220 and resistor 222, which serves to limit the inrush current. As capacitor 262 charges, capacitor 266 charges virtually simultaneously through resistor 264. As capacitor 262 charges and the potential across it increases, the potential across switch 224 decreases proportionally until it is lower than Vlow 301, such that comparator 234 remains on whether it is comparing the voltage across switch 224 to either threshold Vlow 301 or Vhigh 302. During the inrush event, the processor 280 monitors the rate of change of Voltage 304 to determine when the inrush event has sufficiently settled to ensure that the voltage across switch 224 is less than Vlow 301, at which point Arm 306 and Connect 307 are set to on. With comparitor 234 on and Arm 306 on, switch 224 turns on through AND gate 236 which effectively provides a parallel current path that shorts out resistor 222, thus connecting the subscriber loop interface nodes 202 and 204 to charge storage circuit 260, which more rapidly fully charges the charge storage circuit 260. With Connect 307 on, switch 270 is on which connects the fully charged storage circuit 260 to the subsequent electronics 130, 140 at nodes 206 and 208. Operation 310 then transfers to normal operation 312.

It is an advantage of the present invention that the charge storage circuit 260 is located on the subscriber loop side of the protection switch 270 that serves to disconnect the subsequent electronics 130, 140 of the remote equipment 110 from the subscriber loop 104 only when necessary in a fault event, thus providing that the charge storage circuit 260 may continue to be connected to the subscriber loop 104 during fault events, and as such will collect charge from all or a portion of the fault event for the purpose of powering the remote equipment 110. This allows the remote equipment 110, in most cases, to remain in service throughout a fault event, as opposed to known systems in which the intent is to disconnect the fault event energy from the remote equipment 110.

It is a further advantage of the present invention that the presence of the processor 280 allows for flexibility to optimally configure the CSAPC 200 for various fault events. These fault events are sensed by the processor 280 through its Current 303 and Voltage 304 analog inputs, the data from which is processed to control the Connect 307, Inrush 305, and Arm 306 digital outputs of the processor 280 such that the subsequent electronics 130, 140 are subject to minimum stress through rapid response to the fault event. As such, the CSAPC 200 and subsequent electronic components 130, 140 in the remote equipment 110 need not be oversized or made more rugged than required to deliver their function under normal operation, which reduces the cost of the remote equipment 110. Furthermore, this optimization maximizes the probability of avoiding service interruptions due to fault events. Moreover, by implementing the operations 300 in software modules stored in the memory of the processor 280, rather than as a hardware implemented state machine, for example, ease and flexibility of adapting to present and future powering, fault requirements, and features are facilitated.

In the event of a lightning fault where node 202 is more positive than 204, the industry recognized model transient event typically has a rise time to peak voltage and further fall time to half the peak voltage of either 10 µs to 1000V and 1000 µs further to 500 V, or 2 µs to 2500 V and 10 µs to 1250 V, respectively. This transient speed typically exceeds the cumulative response time of sensors, processor algorithms, and subsequent switching events, mitigating the need for a local independent circuit to deal with the fault. In the present invention, circuit 230 is configured to deal with such faults. As lightning current flows through switch 224, a voltage develops across it proportional to its on-impedance. When this potential exceeds Vlow 301, comparator 234 turns off, and turns off switch 224 through AND gate 236. The lightning current continues to flow safely through switch 220 and resistor 222 into the charge storage circuit 260, thus adding more charge to the charge storage circuit 260 to power the subsequent electronics 130, 140 during the fault. With switch 224 off, threshold circuit 240 outputs Vhigh 302 to comparator 234. After switch 224 turns off, the fault increases to its maximum voltage as seen at nodes 202 and 204, then decays until the voltage across switch 224 decreases to a voltage dependant on Vsupply 107, Rloop 101, Iload 109, and the resistance of resistor 222 which under all application conditions settles below Vhigh 302. At that time, comparator 234 turns on which turns on switch 224 through AND gate 236. After which, the potential across switch 224 falls below Vlow 301 more rapidly than the delay 241 which prevents switching in the threshold selection circuit to Vlow 301, such that the comparitor 234 remains on and thus switch 224 remains on through AND gate 236 throughout the termination of the lightning fault event, and the circuit 200 continues under normal operation 312.

In the event of a common mode potential fault, both nodes 202 and 204 will simultaneously reach a potential at the activation voltage of the primary protectors 108, which is typically several hundred volts. In the loop powered remote equipment 110, it is required that all interfaces to earth potential block voltage to a level greater than the worst case activation voltage of the primary protectors 108, typically 1000 V. Thus as all voltages developed in the remote equipment 110 are below the voltage blocked at all interfaces to earth potential, this fault it rendered benign.

In the event of common mode induced current fault, the potential at the powered end 103 of the subscriber loop 104 is tied to earth typically through a few ohms resistance. Thus, a significant potential does not develop and power supply 102 is expected to continue in normal operation indefinitely in the presence of this fault. In the loop powered remote equipment 110, the common mode induced current fault currents, which typically do not exceed 100 mA per subscriber loop wire, are blocked with respect to earth potential at all interfaces and thus do not flow into the CSAPC 200. As a result, they must flow through the subscriber loop resistance, typically 1000 ohms maximum per wire, to the powered end 103 of the subscriber loop 104 which is tied to earth. In this case, the common mode potential developed at nodes 202 and 204 reaches a maximum positive or negative voltage of approximately 100 V, which will not activate the primary protectors 108, nor does it exceed the voltage barrier to earth which is typically 1000 V, and thus this fault is rendered benign.

In the event of power cross fault, or when powered from a local AC mains power source, AC current enters the remote equipment 110 and is half-wave rectified by input diode 210. In the instance that the AC current arrives when the remote equipment 110 is running in normal operation 312, charge from the AC current is added to charge storage circuit 260, and Voltage 304 will rise. Depending on the charge contributed by the AC current, Voltage 304 may not rise above Vmax to require any action, and the processor 280 will continue in linear mode. If Voltage 304 rises above Vmax as detected by operation 320, PWM mode is enabled.

PWM mode is implemented by operation 331 by pulse width modulating Arm 306 to control the state of switch 224 through AND gate 236 to regulate Voltage 304 at Vpwm while the CSAPC 200 is under load by the subsequent electronics 130, 140. Inductors 252 and 254 of the EMI circuit 250 serve to minimize the current peaks of the regulation. Inrush 305 is turned from on to off. The PWM operation 331 phase locks to the half-wave rectified waveform, using Voltage 304 and Current 303, and turns Arm 306 on during the half-period when the waveform is blocked by diode 210 to reduce noise and to modulate the turn-off timing of Arm 306 to occur sometime during the half-period when the waveform is not blocked by diode 210, i.e., when charge is being added to the charge storage circuit 260. The maximum decay of the charge storage circuit 260 must be less than a margined amount below Vlow 301 in order to ensure that comparator 234 remains on constantly during the PWM operation 331, in order for switch 224 to activate through AND gate 236 when Arm 306 is turned on, and to ensure circuit 230 will respond in the event of lightning while in PWM mode.

In the example given above, if the total capacitance 262, 266 of the charge storage circuit 260 is 500 μF and the maximum Iload 109 is 700 mA, the decay in one cycle at an AC current frequency of 60 Hz is 6 V, in which case the selection of Vlow 301 at 10 V would ensure proper operation. As such, the operation of the remote equipment 110 may continue indefinitely in the presence of added AC current. When the fault is removed, or for example the AC current is reduced, the additional charge added to charge storage circuit 260 will be reduced, Voltage 304 will decrease, the pulse width modulation will no longer be required as detected by process 332, and operations 300 will return to Linear mode by operation 333.

Due to a fault event, the equipment 102 providing the power at the powered end 103 of the subscriber loop 104 may activate its own protection circuitry and disconnect from the loop 104. In this case, the operation of the remote equipment 110 would have to be sustained solely from the charge delivered by the fault, which may not be sufficient, in which case Voltage 304 would decrease. Also, it may occur that under normal operation of the remote equipment 110, excessive functionality or services are enabled, or an equipment failure occurs, or a fault occurs within the subsequent electronics 130, 140, in which case Current 303 would increase. According to another aspect of the invention, operation 340 can determine if Current 303 exceeds Imax, or if Voltage 304 is below voltage Vmin, in which case operation 341 is executed to reduce in graduated fashion the operating conditions experienced by the subsequent electronics 130, 140. Such a change in operating conditions may include the dynamic reduction (e.g., minimization) in services provided by the remote equipment 110. If the changes in operating conditions cannot be reduced further, operation 342 is selected to power down the remote equipment 110 and then proceed to enter the Initialize operation 310.

It is a further advantage of the invention that the subscriber loop 104 used to loop power the remote equipment 110 may also be utilized to carry transmission information to the remote equipment 110 using a transmission protocol including, for example, the POTS frequency band, ISDN, DSL, or other protocols.

While aspects of the invention are primarily discussed as a process or method, a person of ordinary skill in the art understands that the apparatus discussed above with reference to a CSAPC 200 and processor 280 may be programmed to enable the practice of the method of the invention. Moreover, an article of manufacture for use with a CSAPC 200 and processor 280, such as a pre-recorded storage device or other similar computer readable medium including program instructions recorded thereon may direct the CSAPC 200 and processor 280 to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

We claim:

1. A protection circuit for telecommunications equipment powered remotely through a twisted pair subscriber loop, comprising:
   a charge storage circuit, coupled to the subscriber loop through an arm switch in parallel with an inrush resistor, for storing charge received from the subscriber loop, the charge storage circuit coupled to the telecommunications equipment for providing the charge thereto;
   a fault detection circuit for setting a first signal during a period of normal operation of the protection circuit and for resetting the first signal for a predetermined period during a fault said fault detection circuit including a threshold selection circuit for outputting one of two voltages to a positive input of a voltage comparator;
   a delay circuit for implementing the change in threshold output a short time after a change of state of said arm switch;
   a processor adapted for setting an arm signal during the period of normal operation of the protection circuit; and,
   an AND logic circuit coupled to the arm switch, fault detection circuit, and processor for comparing the first and arm signals to set a third signal for closing the arm switch during the period of normal operation and to reset the third signal for opening the arm switch during the predetermined period during the fault; whereby the charge storage circuit continues storing charge through the inrush resistor during the fault.

2. The protection circuit of claim 1 wherein the fault detection circuit provides the first signal by comparing a voltage measured across the arm switch to predetermined low and high voltages for each of the period of normal operation and the predetermined period during the fault, respectively.

3. The protection circuit of claim 1 and further comprising a diode circuit coupled between the arm switch and the subscriber loop for half-wave rectifying input voltage and current signals from the subscriber loop.

4. The protection circuit of claim 1 and further comprising a suppression circuit coupled between the arm switch and the subscriber loop for suppressing electro-magnetic interference (EMI) on the input voltage and current signals.

5. The protection circuit of claim 4 wherein the suppression circuit includes first and second series inductors coupled to a parallel capacitor.

6. The protection circuit of claim 1 and further comprising a connect switch coupled between the charge storage circuit and the telecommunications equipment, the connect switch coupled to and controlled by the processor through a connect signal to disconnect the protection circuit from the telecommunications equipment.

7. The protection circuit of claim 1 wherein the fault includes a lightning induced current fault, a lightning induced voltage fault, a power cross fault, and induced AC current from mains power wires.

8. The protection circuit of claim 1 wherein the processor is a microprocessor.

9. The protection circuit of claim 1 wherein the processor is a state machine.

10. The protection circuit of claim 1 wherein the processor is a linear circuit.

11. A protection circuit for telecommunications equipment powered remotely through a twisted pair subscriber loop, comprising:
   a charge storage circuit, coupled to the subscriber loop through an arm switch in parallel with an inrush resistor, for storing charge received from the subscriber loop, the charge storage circuit coupled to the telecommunications equipment for providing the charge thereto;
   a fault detection circuit for setting a first signal during a period of normal operation of the protection circuit and for resetting the first signal for a predetermined period during a fault;
   a processor adapted for setting an arm signal during the period of normal operation of the protection circuit;
   an AND logic circuit coupled to the arm switch, fault detection circuit, and processor for comparing the first and arm signals to set a third signal for closing the arm switch during the period of normal operation and to reset the third signal for opening the arm switch during the predetermined period during the fault; whereby the charge storage circuit continues storing charge through the inrush resistor during the fault;
   a connect switch coupled between the charge storage circuit and the telecommunications equipment, the connect switch coupled to and controlled by the processor through a connect signal to disconnect the protection circuit from the telecommunications equipment; and,
   an inrush switch coupled in series with the inrush resistor, the inrush switch coupled to and controlled by the processor through an inrush signal to disconnect the inrush resistor.

12. The protection circuit of claim 11 wherein the charge storage circuit includes:
   a voltage sensor coupled to the processor for measuring voltage provided to the telecommunications equipment and for providing a corresponding voltage signal to the processor; and, a current sensor coupled to the processor for measuring current provided to the telecommunications equipment and for providing a corresponding current signal to the processor.

13. The protection circuit of claim 12 wherein the charge storage circuit further includes a series resistor coupled between first and second parallel capacitors.

14. The protection circuit of claim 13 wherein the voltage sensor measures voltage across the first parallel capacitor and the current sensor measures current by measuring the voltage across the series resistor.

15. The protection circuit of claim 12 wherein the processor is further adapted to, when the voltage signal exceeds a predetermined maximum voltage: reset the inrush signal to open the inrush switch and disconnect the inrush resistor; and, modulate the arm signal, thereby reducing the voltage provided to the telecommunications equipment.

16. The protection circuit of claim 15 wherein the arm signal is pulse-width modulated.

17. The protection circuit of claim 12 wherein the processor is further adapted to reset the connect signal to open the connect switch and disconnect the protection circuit from the telecommunications equipment when at least one of the voltage signal is below a predetermined minimum voltage and the current signal exceeds a predetermined maximum current.

18. The protection circuit of claim 12 wherein the processor is further adapted to, during a period of initial operation of the protection circuit: reset the arm signal to open the arm switch; reset the connect signal to open the connect switch; and, set the inrush signal to close the inrush switch, thereby allowing the charge storage circuit to charge through the inrush resistor.

19. The protection circuit of claim 18 wherein the processor is further adapted to, when the voltage signal drops below the predetermined low voltage: set the arm signal to close the arm switch and short out the inrush resistor, thereby allowing the charge storage circuit to charge more rapidly through the arm switch; and, set the connect signal to close the connect switch.

20. A method for protecting telecommunications equipment powered remotely through a twisted pair subscriber loop, comprising:
   storing charge received from the subscriber loop in a charge storage circuit coupled to the subscriber loop through an arm switch in parallel with an inrush resistor, the charge storage circuit coupled to the telecommunications equipment for providing the charge thereto;
   setting a first signal with a fault detection circuit during a period of normal operation and resetting the first signal for a predetermined period during a fault;
   setting an arm signal with a processor during the period of normal operation; and,
   comparing the first and arm signals with an AND logic circuit coupled to the arm switch, fault detection circuit, and processor to set a third signal for closing the arm switch during the period of normal operation and to reset the third signal for opening the arm switch during the predetermined period during the fault; whereby the charge storage circuit continues storing charge through the inrush resistor during the fault;
   disconnecting the telecommunications equipment with a connect switch coupled between the charge storage circuit and the telecommunications equipment, the connect switch coupled to and controlled by the processor through a connect signal; and,
   disconnecting the inrush resistor with an inrush switch coupled in series with the inrush resistor, the inrush switch coupled to and controlled by the processor through an inrush signal.

21. The method of claim 20 wherein the fault detection circuit provides the first signal by comparing a voltage measured across the arm switch to predetermined low and high voltages for each of the period of normal operation and the predetermined period during the fault, respectively.

22. The method of claim 20 and further comprising half-wave rectifying input voltage and current signals from the subscriber loop with a diode circuit coupled between the arm switch and subscriber loop.

23. The method of claim 20 and further comprising suppressing electro-magnetic interference (EMI) on input voltage and current signals with a suppression circuit coupled between the arm switch and the subscriber loop.

24. The method of claim 23 wherein the suppression circuit includes first and second series inductors coupled to a parallel capacitor.

25. The method of claim 20 wherein the charge storage circuit includes:
 a voltage sensor coupled to the processor for measuring voltage provided to the telecommunications equipment and for providing a corresponding voltage signal to the processor; and, a current sensor coupled to the processor for measuring current provided to the telecommunications equipment and for providing a corresponding current signal to the processor.

26. The method of claim 25 wherein the charge storage circuit further includes a series resistor coupled between first and second parallel capacitors.

27. The method of claim 26 wherein the voltage sensor measures voltage across the first parallel capacitor and the current sensor measures current by measuring the voltage across the series resistor.

28. The method of claim 25 and further comprising, when the voltage signal exceeds a predetermined maximum voltage: resetting the inrush signal with the processor to open the inrush switch and disconnect the inrush resistor; and,
 modulating the arm signal with the processor, thereby reducing the voltage provided to the telecommunications equipment.

29. The method of claim 28 wherein the arm signal is pulse-width modulated.

30. The method of claim 25 and further comprising resetting the connect signal with the processor to open the connect switch and disconnect the protection circuit from the telecommunications equipment when at least one of the voltage signal is below a predetermined minimum voltage and the current signal exceeds a predetermined maximum current.

31. The method of claim 25 and further comprising, during a period of initial operation: resetting the arm signal with the processor to open the arm switch; resetting the connect signal to open the connect switch; and, setting the inrush signal to close the inrush switch, thereby allowing the charge storage circuit to charge through the inrush resistor.

32. The method of claim 31 and further comprising, when the voltage signal drops below the predetermined low voltage: setting the arm signal with the processor to close the arm switch and short out the inrush resistor, thereby allowing the charge storage circuit to charge more rapidly through the arm switch; and, setting the connect signal to close the connect switch.

33. The method of claim 20 wherein the fault includes a lightning induced current fault, a lightning induced voltage fault, a power cross fault, and induced AC current from mains power wires.

34. The method of claim 20 wherein the processor is a microprocessor.

35. The method of claim 20 wherein the processor is a state machine.

36. The method of claim 20 wherein the processor is a linear circuit.

* * * * *